(12) United States Patent
Kim et al.

(10) Patent No.: US 11,983,121 B1
(45) Date of Patent: May 14, 2024

(54) CACHE MEMORY DEVICE AND METHOD FOR IMPLEMENTING CACHE SCHEDULING USING SAME

(71) Applicant: METISX CO., LTD., Yongin-si (KR)

(72) Inventors: Do Hun Kim, Yongin-si (KR); Keebum Shin, Seongnam-si (KR); Kwangsun Lee, Yongin-si (KR)

(73) Assignee: METISX CO., LTD., Yongin-si (KR)

( * ) Notice: Subject to any disclaimer, the term of this patent is extended or adjusted under 35 U.S.C. 154(b) by 0 days.

(21) Appl. No.: 18/510,232

(22) Filed: Nov. 15, 2023

(30) Foreign Application Priority Data

Apr. 19, 2023 (KR) .................. 10-2023-0051364

(51) Int. Cl.
*G06F 12/123* (2016.01)
*G06F 12/0895* (2016.01)

(52) U.S. Cl.
CPC ........ *G06F 12/123* (2013.01); *G06F 12/0895* (2013.01)

(58) Field of Classification Search
CPC ........................... G06F 12/0895; G06F 12/123
See application file for complete search history.

(56) References Cited

U.S. PATENT DOCUMENTS

| | | | | |
|---|---|---|---|---|
| 7,721,011 B1 * | 5/2010 | Sutera | ................... | G06F 1/3225 711/158 |
| 10,482,027 B2 * | 11/2019 | Zhang | ................ | G06F 12/0871 |
| 2023/0376414 A1 * | 11/2023 | Kim | ........................ | G06F 12/06 |

FOREIGN PATENT DOCUMENTS

| | | |
|---|---|---|
| JP | 2006-253790 A | 9/2006 |
| KR | 10-0320977 B1 | 1/2002 |
| KR | 2006-253790 A | 9/2006 |
| KR | 10-0814270 B1 | 3/2008 |
| KR | 10-2019-0090614 A | 8/2019 |
| KR | 10-2020-0096971 A | 8/2020 |
| KR | 10-2020-0112435 A | 10/2020 |
| KR | 10-2022-0110225 A | 8/2022 |

OTHER PUBLICATIONS

Request for Submission of Opinion for Korean Patent Application No. 10-2023-0051364 dated Jul. 14, 2023.
Written Decision on Registration for Korean Patent Application No. 10-2023-0051364 dated Sep. 1, 2023.
Written Decision on Registration for Korean Application No. 10-2023-0051364 dated Sep. 1, 2023.

* cited by examiner

*Primary Examiner* — Aracelis Ruiz
(74) *Attorney, Agent, or Firm* — Sughrue Mion, PLLC (57) ABSTRACT

Provided is a cache memory device including a command reception unit for packetizing each of read commands and write commands and classifying them as even or odd; a cache scheduler comprising a first reorder scheduling queue for receiving commands classified as even numbers from the command reception unit and scheduling the commands classified as even numbers for cache memory accesses and a second reorder scheduling queue for receiving commands classified as odd numbers from the command reception unit and scheduling the commands classified as odd numbers for cache memory accesses; and an access execution unit for performing cache memory accesses via a cache tag to scheduled commands classified as even numbers and scheduled commands classified as odd numbers.

16 Claims, 2 Drawing Sheets

CACHE MEMORY DEVICE AND METHOD FOR IMPLEMENTING CACHE SCHEDULING USING SAME

CROSS-REFERENCE TO RELATED APPLICATION

This application claims priority under 35 U.S.C § 119 to Korean Patent Application No. 10-2023-0051364 filed on Apr. 19, 2023, in the Korean Intellectual Property Office, the entire contents of which is hereby incorporated by reference.

TECHNICAL FIELD

The present disclosure relates to a cache memory device and a method for implementing cache scheduling using the same, and more particularly, to a cache memory device capable of implementing full-duplex or near full-duplex scheduling by providing a dual scheduling mechanism using two or more cache schedulers, and a method for implementing cache scheduling using the same.

BACKGROUND

A cache is a storage device located between a processor (CPU) and a main storage device, and the cache reduces the difference between the computation speed of the processor and the memory access speed, allowing the processor to access data at high speeds. To this end, the cache is located adjacent to the processor and serves as a temporary storage that retrieves and stores data from a main storage device or auxiliary storage device in advance according to the principle of locality of reference.

In general, a processor first accesses data stored in the cache, but if the required data is not stored in the cache, the processor will access data stored in a main storage device or auxiliary storage device. If the processor obtains the required data from the cache, this is called a 'cache hit.' On the other hand, if the processor fails to obtain the required data from the cache but obtains it from the main storage device or auxiliary storage device, this is called a 'cache miss.' A cache hit-rate refers to the number of cache hits/(the number of cache hits+the number of cache misses), and this cache hit-rate is used as a key indicator in determining cache performance.

On the other hand, as for the AXI-based SoC (system-on-chip) proposed following the trend toward NoC (network-on-chip), which is possible to perform writes and reads independently, it is general to implement a full-duplex design processing writes and reads simultaneously, whereas mostly a half-duplex design is applied in the case of memory or cache.

In the case of applying a full-duplex design to the cache, although faster data transfer speeds could be provided between a processor and a cache in theory, the complexity increases when implementing a full-duplex design due to the fact that the cache primarily interacts with memories (to which a half-duplex design is primarily applied) and the operational characteristics of the cache itself. However, there is a need for measures that can apply a full-duplex design that simultaneously process write commands and read commands to the cache in order to increase the memory access efficiency of the cache.

SUMMARY

Therefore, it is one object of the present disclosure to provide measures that can avoid degradation of the PPA of a cache scheduler or a cache by reducing the complexity when implementing the cache scheduler while improving the bandwidth throughput of the cache by applying a full-duplex design to the cache.

However, the objects to be achieved by the present disclosure are not limited to those mentioned above, and may include objects that have not been mentioned but can be clearly understood by those of ordinary skill in the art to which the present disclosure pertains from the description below.

In the following, specific means for achieving the objects of the present disclosure will be described.

As one aspect of the present disclosure, a cache memory device is disclosed. The device comprises: a command reception unit for packetizing each of read commands and write commands and classifying them as even or odd; a cache scheduler comprising a first reorder scheduling queue for receiving commands classified as even numbers from the command reception unit and scheduling the commands classified as even numbers for cache memory accesses and a second reorder scheduling queue for receiving commands classified as odd numbers from the command reception unit and scheduling the commands classified as odd numbers for cache memory accesses; and an access execution unit for performing cache memory accesses via a cache tag to scheduled commands classified as even numbers and scheduled commands classified as odd numbers, wherein the access execution unit processes a first command and a second command at the same time if one of the two commands is a read command and the other of the two commands is a write command, wherein the first command is a command whose processing turn has arrived among the scheduled commands classified as even numbers and the second command is a command whose processing turn has arrived among the scheduled commands classified as odd numbers.

In one embodiment, in order for the first reorder scheduling queue and the second reorder scheduling queue to process the first command and the second command at the same time, if the first command selected by the first reorder scheduling queue is one of a read command and a write command, then the second reorder scheduling queue selects the second command as the other of the read command and the write command.

In one embodiment, the access execution unit processes a first command and a second command in sequence if both the first command whose processing turn has arrived among the scheduled commands classified as even numbers and the second command whose processing turn has arrived among the scheduled commands classified as odd numbers are read commands or write commands.

In one embodiment, the cache tag comprises: a first cache tag for allowing cache memory accesses to be executed to the scheduled commands classified as even numbers; and a second cache tag for allowing cache memory accesses to be executed to the scheduled commands classified as odd numbers.

In one embodiment, the device further comprises: a first completion scheduling queue for queuing access results to write commands that have been cache-hit among the scheduled commands classified as even numbers and the scheduled commands classified as odd numbers as a result of performing cache memory accesses by the access execution unit; and a second completion scheduling queue for queuing access results to read commands that have been cache-hit among the scheduled commands classified as even numbers and the scheduled commands classified as odd numbers as a result of performing the cache memory accesses by the access execution unit.

In one embodiment, the device further comprises: a first direct memory access module for performing direct memory accesses to write commands that have been cache-missed among the scheduled commands classified as even numbers and the scheduled commands classified as odd numbers as a result of performing cache memory accesses by the access execution unit; and a second direct memory access module for performing direct memory accesses to read commands that have been cache-missed among the scheduled commands classified as even numbers and the scheduled commands classified as odd numbers as a result of performing the cache memory accesses by the access execution unit.

In one embodiment, even-odd classification for each of the read commands and the write commands is made based on a least significant bit (LSB) of an address of each of the read commands and the write commands.

In one embodiment, the command reception unit comprises: a reception queue for receiving the write commands and the read commands from a processor; a first decoder for decoding and packetizing the received write commands in units of cache lines; and a second decoder for decoding and packetizing the received read commands in units of cache lines.

In one embodiment, the cache scheduler comprises: a first arbiter for receiving the commands classified as even numbers from the first decoder and the second decoder of the command reception unit and transferring the commands classified as even numbers to the first reorder scheduling queue; and a second arbiter for receiving the commands classified as odd numbers from the first decoder and the second decoder of the command reception unit and transferring the commands classified as odd numbers to the second reorder scheduling queue, wherein the first arbiter and the second arbiter are round robin arbiters.

As one aspect of the present disclosure, a computing system is disclosed. The system comprises: a processor; a main storage device for storing commands or data associated with a program executed via the processor; an auxiliary storage device for assisting the main storage device; and a cache memory device located between the processor and the main storage device for temporarily storing commands or data of the main storage device or the auxiliary memory device, wherein the cache memory device comprises: a command reception unit for packetizing each of read commands and write commands and classifying each of the read commands and the write commands as an even number or an odd number based on an address of each packet; a cache scheduler comprising a first reorder scheduling queue for receiving commands classified as even numbers from the command reception unit and scheduling the commands classified as even numbers for cache memory accesses and a second reorder scheduling queue for receiving commands classified as odd numbers from the command reception unit and scheduling the commands classified as odd numbers for cache memory accesses; and an access execution unit for performing memory accesses via a cache tag to scheduled commands classified as even numbers and scheduled commands classified as odd numbers, wherein the access execution unit processes a first command and a second command at the same time if one of the two commands is a read command and the other of the two commands is a write command, wherein the first command is a command whose processing turn has arrived among the scheduled commands classified as even numbers and the second command is a command whose processing turn has arrived among the scheduled commands classified as odd numbers.

As one aspect of the present disclosure, a method for implementing cache scheduling is disclosed. The method comprises: packetizing each of read commands and write commands and classifying each of the read commands and the write commands as an even number or an odd number based on an address of each packet; transferring commands classified as even numbers to a first reorder scheduling queue for scheduling for cache memory accesses, and transferring commands classified as odd numbers to a second reorder scheduling queue for scheduling for cache memory accesses; transferring scheduled commands classified as even numbers and scheduled commands classified as odd numbers to an access execution unit for performing memory accesses; and performing cache memory accesses to the scheduled commands classified as even numbers and the scheduled commands classified as odd numbers via a cache tag, wherein the performing the cache memory accesses comprises: processing a first command and a second command at the same time if one of the two commands is a read command and the other of the two commands is a write command, wherein the first command is a command whose processing turn has arrived among the scheduled commands classified as even numbers and the second command is a command whose processing turn has arrived among the scheduled commands classified as odd numbers.

In one embodiment, in order for the first reorder scheduling queue and the second reorder scheduling queue to process the first command and the second command at the same time, if the first command selected by the first reorder scheduling queue is one of a read command and a write command, then the second reorder scheduling queue selects the second command as the other of the read command and the write command.

In one embodiment, the performing the cache memory accesses comprises: processing a first command and a second command in sequence by the access execution unit if both the first command whose processing turn has arrived among the scheduled commands classified as even numbers and the second command whose processing turn has arrived among the scheduled commands classified as odd numbers are read commands or write commands.

In one embodiment, the performing the cache memory accesses comprises: executing cache memory accesses to the scheduled commands classified as even numbers via a first cache tag; and executing cache memory accesses to the scheduled commands classified as odd numbers via a second cache tag.

In one embodiment, the method further comprises: queuing, in a first completion scheduling queue, access results to write commands that have been cache-hit among the scheduled commands classified as even numbers and the scheduled commands classified as odd numbers as a result of performing the cache memory accesses; and queuing, in a second completion scheduling queue, access results to read commands that have been cache-hit among the scheduled commands classified as even numbers and the scheduled commands classified as odd numbers as a result of performing the cache memory accesses.

In one embodiment, the method further comprises: performing direct memory accesses, to at least one of a main storage device and an auxiliary storage device, for write commands that have been cache-missed among the scheduled commands classified as even numbers and the scheduled commands classified as odd numbers as a result of performing the cache memory accesses; and performing direct memory accesses, to at least one of a main storage device and an auxiliary storage device, for read commands that have been cache-missed among the scheduled commands classified as even numbers and the scheduled commands classified as odd numbers as a result of performing the cache memory accesses.

As described above, there are the following effects according to the present disclosure.

According to embodiments of the present disclosure, it is possible to provide measures that can avoid degradation of the PPA of a cache scheduler or a cache by reducing the complexity when implementing the cache scheduler while improving the bandwidth throughput of the cache by applying a full-duplex design to the cache.

However, the effects that can be obtained with the present disclosure are not limited to those mentioned above, and other effects that have not been mentioned will be clearly understood by those of ordinary skill in the art to which the present disclosure pertains from the description below.

BRIEF DESCRIPTION OF THE DRAWINGS

As the following drawings accompanying the present specification illustrate preferred embodiments of the present disclosure and serve to help further understand the technical idea of the present disclosure together with the detailed description of the present disclosure, the present disclosure should not be construed as being limited to those described in such drawings.

DETAILED DESCRIPTION OF THE PREFERRED EMBODIMENTS

The various embodiments described herein are illustrated for the purpose of clearly describing the technical idea of the present disclosure, and are not intended to limit it to particular embodiments. The technical idea of the present disclosure includes various modifications, equivalents, and alternatives of each embodiment described herein, and embodiments obtained by selectively combining all or part of each embodiment. In addition, the scope of the technical idea of the present disclosure is not limited to the various embodiments or specific descriptions thereof presented below.

Terms used herein, including technical or scientific terms, may have the meaning commonly understood by those of ordinary skill in the art to which the present disclosure pertains unless defined otherwise.

As used herein, expressions such as "include(s)," "may include," "is/are provided with", "may be provided with," "have/has," "can have," and the like mean that target features (e.g., functions, operations, components, or the like) exist, and do not preclude the presence of other additional features. That is, such expressions should be understood as open-ended terms that imply the possibility of including other embodiments.

Singular expressions herein include plural expressions unless the context clearly dictates that they are singular. Further, plural expressions include singular expressions unless the context clearly dictates that they are plural. Throughout the specification, when a part is said to include a component, this means that it may further include other components rather than excluding other components unless particularly described to the contrary.

Further, the term 'module' or 'part' used herein refers to a software or hardware component, and the 'module' or 'part' performs certain roles. However, the 'module' or 'part' is not meant to be limited to software or hardware. The 'module' or 'part' may be configured to reside on an addressable storage medium or may be configured to run one or more processors. Therefore, as one example, the 'module' or 'part' may include at least one of components such as software components, object-oriented software components, class components, and task components, processes, functions, properties, procedures, subroutines, segments of program code, drivers, firmware, microcode, circuitry, data, databases, data structures, tables, arrays, or variables. Functions provided within the components and the 'modules' or 'parts' may be combined into a smaller number of components and 'modules' or 'parts,' or may be further separated into additional components and 'modules' or 'parts.'

According to one embodiment of the present disclosure, a 'module' or 'part' may be implemented with a processor and a memory. The 'processor' should be interpreted broadly so as to encompass general-purpose processors, central processing units (CPUs), microprocessors, digital signal processors (DSPs), controllers, microcontrollers, state machines, and the like. In some circumstances, the 'processor' may also refer to an application-specific integrated circuit (ASIC), a programmable logic device (PLD), a field programmable gate array (FPGA), or the like. The 'processor' may also refer to, for example, a combination of processing devices, such as a combination of a DSP and a microprocessor, a combination of a plurality of microprocessors, a combination of one or more microprocessors combined with a DSP core, or a combination of any other such components. In addition, the 'memory' should be interpreted broadly so as to encompass any electronic component capable of storing electronic information. The 'memory' may also refer to various types of processor-readable media, such as random-access memory (RAM), read-only memory (ROM), non-volatile random-access memory (NVRAM), programmable read-only memory (PROM), erasable-programmable read-only memory (EPROM), electrically erasable PROM (EEPROM), flash memory, magnetic or optical data storage, registers, etc. A memory is said to be in electronic communication with a processor if the processor can read information from and/or write information to the memory. A memory integrated with a processor is in electronic communication with the processor.

As used herein, expressions such as "first" and "second" are used to distinguish one object from another when referring to a plurality of objects of the same kind unless the context indicates otherwise, and do not limit the order or importance among the relevant objects.

As used herein, expressions such as "A, B, and C," "A, B, or C," "A, B, and/or C," or "at least one of A, B, and C," "at least one of A, B, or C one," "at least one of A, B, and/or C," "at least one selected from A, B, and C," "at least one selected from A, B, or C," and "at least one selected from A, B, and/or C" may mean all possible combinations of each listed item or listed items. For example, "at least one selected from A and B" may refer to all of (1) A, (2) at least one of A's, (3) B, (4) at least one of B's, (5) at least one of A's and at least one of B's, (6) at least one of A's and B, (7) at least one of B's and A, (8) A and B.

As used herein, the expression "based on" is used to describe one or more factors that affect the action or operation of a decision or determination described in the phrase or sentence including the expression, and this expression does not preclude additional factors that affect the action or operation of that decision or determination.

As used herein, the expression that a component (e.g., a first component) is "connected" or "coupled" to another component (e.g., a second component) may mean that said component is connected or coupled to said another component directly, as well as connected or coupled via yet another component (e.g., a third component).

As used herein, the expression "configured to" may have the meaning of "set to," "having the ability to," "modified to," "made to," "capable of," etc., depending on the context. The expression is not limited to the meaning of "designed specifically in hardware," and for example, a processor configured to perform a particular operation may refer to a generic-purpose processor capable of performing that particular operation by executing software.

Hereinafter, various embodiments of the present disclosure will be described with reference to the accompanying drawings. In the accompanying drawings and description of the drawings, identical or substantially equivalent components may be given the same reference numerals. Further, in the description of various embodiments below, repetitive descriptions of the same or corresponding components may be omitted, which, however, does not mean that such components are not included in that embodiment.

Basic Structure of Computing System

Figure 1:
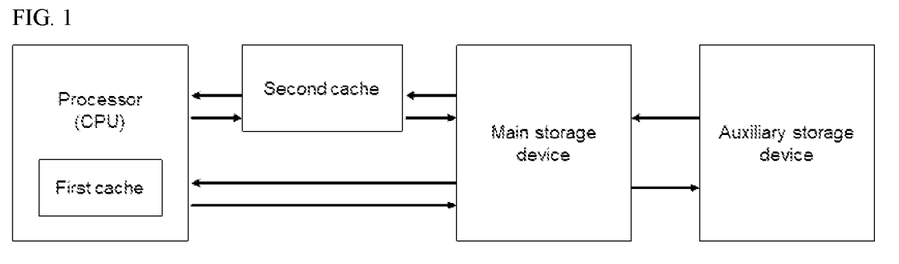
FIG. 1 is a diagram describing the basic configuration of a computer system in accordance with one embodiment of the present disclosure.

FIG. 1 is a diagram describing the basic configuration of a computing system in accordance with one embodiment of the present disclosure.

Referring to FIG. 1, the computing system may include a processor (CPU), a main storage device used by the processor (CPU) to directly read or write commands or data of a program executed via the processor (CPU), and an auxiliary storage device to assist the main storage device. Further, the processor (CPU) of the computing system may include a first cache memory device, and may include a second cache memory device between the processor (CPU) and the main storage device. The first cache memory device refers to a cache in a form built into the processor (CPU), and the second cache memory device refers to a cache formed on a main board or the like outside the processor (CPU). The cache memory device in accordance with embodiments of the present disclosure may be the first cache memory device or the second cache memory device, and may be any one of L1, L2, and L3 caches that are commonly mentioned, but is not limited thereto.

The cache memory device is a storage device located between a processor (CPU) and a main storage device, and serves as a temporary storage that retrieves and temporarily stores data from the main storage device or the auxiliary storage device in advance according to the principle of locality of reference so that the processor can access the data at high speeds by reducing the bottleneck of the data by reducing the difference between the computation speed of the processor and the memory access speed.

In general, existing cache memory devices operate in a half-duplex cache scheduling scheme that sequentially processes read and write commands received from a processor. In comparison, the cache memory devices in accordance with embodiments of the present disclosure have been designed to support full-duplex or near full-duplex cache scheduling by making it possible to implement a cache scheduling scheme that can process read and write commands at least partially simultaneously. This full-duplex cache scheduling design has previously been avoided in the sense that it would increase the complexity of the cache scheduler, but the present disclosure resolved this issue by proposing a dual scheduling mechanism via a multi-cache scheduler architecture. This will be described in detail below.

Cache Memory Device Including Multi-Cache Scheduler Architecture

First Embodiment

Figure 2:
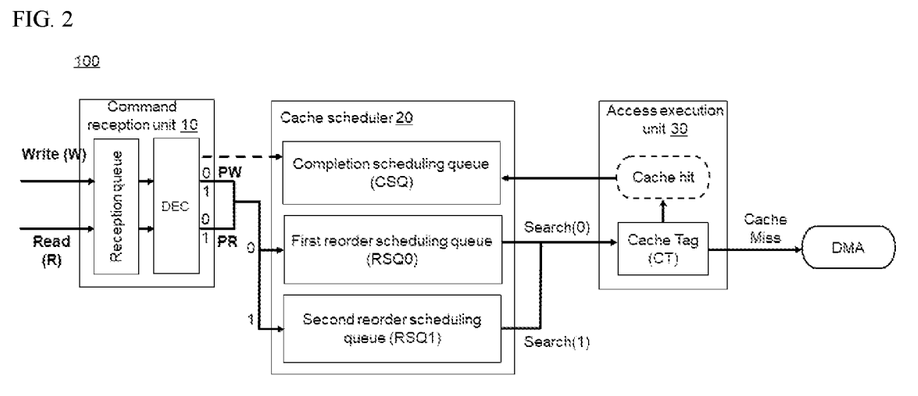
FIG. 2 is a diagram schematically showing a cache memory device including a multi-cache scheduler architecture in accordance with a first embodiment of the present disclosure.

FIG. 2 is a diagram schematically showing a cache memory device including a multi-cache scheduler architecture in accordance with a first embodiment of the present disclosure.

Referring to FIG. 2, a cache memory device 100 including a multi-cache scheduler architecture in accordance with one embodiment of the present disclosure may comprise a command reception unit 10, a cache scheduler 20, and an access execution unit 30.

The command reception unit 10 may receive write W commands and read R commands from the processor (CPU). These commands may be sent and received via a bus structure (not shown) between the processor and the cache memory device 100. Further, the command reception unit 10 may packetize and classify the received write commands and read commands. Accordingly, the command reception unit 10 may include a reception queue (request queue) for receiving write commands and read commands, and a decoder DEC for decoding the received write commands and read commands, packetizing them into a size suitable for memory accesses in units of cache lines, and generating write command packets PW and read command packets PR, respectively.

In addition, the command reception unit 10 may further include a classifier (not shown) for classifying the generated write command packets PW and read command packets PR. According to one embodiment, the classification of the write command packets PW and the read command packets PR may be an even-odd classification based on the least significant bit (LSB) of the address of each packet. That is, each command may be classified based on whether the LSB of the address of each packet is even (0) or odd (1). However, according to another embodiment, each command may be classified into three or more rather than an even-odd classification, in which case, the LSB and the next higher bit of the LSB may be utilized. On the other hand, such LSB classification may be performed based on factors other than the address of each packet, and is not limited thereto. Further, the classification of each packet may also be performed by the cache scheduler 20 or the like in addition to the command reception unit 10, and is not limited thereto.

The cache scheduler 20 is a module for scheduling memory accesses, including cache memory accesses and direct memory accesses DMA corresponding to the write commands and read commands received from the processor. The cache scheduler 20 in accordance with one embodiment of the present disclosure may include a multi-cache scheduler architecture, i.e., a design including a plurality of reorder scheduling queues RSQ. Meanwhile, such a cache scheduler 20 may be included in the cache controller or may be formed as a separate module.

To describe further, the cache scheduler 20 can support various functions such as out-of-order execution and completion, write early completion, etc., and may be implemented by applying complex mechanisms such as the Tomasulo algorithm in order to enhance memory access efficiency. Therefore, the cache scheduler 20 falls within a module with high complexity among all the designs of the cache memory device 100.

The cache scheduler 20 in accordance with one embodiment of the present disclosure is designed to support full-duplex cache scheduling, which is differentiated from existing cache schedulers being designed to implement half-duplex cache scheduling in general. There are a variety of reasons for not implementing a full-duplex design in existing cache schedulers, and one of them is because if read and write commands are processed together in addition to applying a complex mechanism such as the Tomasulo algorithm described above, the complexity increases further, which may cause the scheduler PPA to degrade due to the dual-issue. As one example, the cache scheduler schedules the entire process such as (1) checking the dependency of data, (2) determining traffic that can be processed out of order, and (3) processing out-of-order completion, and, under this circumstance, if read and write commands are processed together, the complexity will increase even more significantly.

Accordingly, the cache scheduler 20 in accordance with an embodiment of the present disclosure may include a plurality of reorder scheduling queues RSQ and a completion scheduling queue CSQ, and shown in FIG. 2 is an example in which the cache scheduler 20 includes two reorder scheduling queues, i.e., a first reorder scheduling queue RSQ0 and a second reorder scheduling queue RSQ1. However, the number of reorder scheduling queues may vary depending on the design and is not limited thereto.

The reorder scheduling queue is also called a re-order buffer ROB, and may store all decoded commands according to the order in which they have been inputted from the processor, and then commit the commands that have completed the computation in the original order (i.e., the order in which they were inputted from the processor), thereby acting to cause the processor (CPU) to recognize as if out-of-order execution had not occurred.

According to one embodiment, as described above, write command packets PW and read command packets PR classified as even numbers (0) (hereinafter referred to as even-classified commands) based on the LSB from the command reception unit 10 may be inputted to the first reorder scheduling queue RSQ0, and write command packets PW and read command packets PR classified as odd numbers (1) (hereinafter referred to as odd-classified commands) may be inputted to the second reorder scheduling queue RSQ1.

The first reorder scheduling queue RSQ0 may be allowed to perform cache memory accesses by checking data dependency, whether out-of-order traffic can be allocated, and the like, and subsequently performing scheduling on the even-classified commands based on the Tomasulo algorithm or the like and transmitting them to the access execution unit 30. Likewise, the second reorder scheduling queue RSQ1 may be allowed to perform cache memory accesses by checking data dependency, whether out-of-order traffic can be allocated, and the like, and subsequently performing scheduling on the odd-classified commands and transmitting them to the access execution unit 30.

The access execution unit 30 may perform cache memory accesses via a cache tag CT to the received commands classified as even numbers and commands classified as odd numbers scheduled by the first reorder scheduling queue RSQ0 and the second reorder scheduling queue RSQ1, respectively.

At this time, according to one embodiment of the present disclosure, the access execution unit 30 may process a first command and a second command at the same time if one the two commands is a read command and the other one of the two commands is a write command, wherein the first command is a command whose processing turn has arrived among the scheduled commands classified as even numbers and the second command is a command whose processing turn has arrived among the scheduled commands classified as odd numbers.

However, the access execution unit 30 may process a first command and a second command in sequence if both the first command whose processing turn has arrived among the scheduled commands classified as even numbers and the second command whose processing turn has arrived among the scheduled commands classified as odd numbers are read commands or write commands.

In addition, according to one embodiment of the present disclosure, the first reorder scheduling queue RSQ0 and the second reorder scheduling queue RSQ1 may operate to appropriately select commands in order to process the first command and the second command at the same time. For example, if the first command selected by the first reorder scheduling queue RSQ0 is a read command, then the second reorder scheduling queue RSQ1 may select the second command as a write command, and conversely, if the first command selected by the first reorder scheduling queue RSQ0 is a write command, then the second reorder scheduling queue RSQ1 may select the second command as a read command. However, the second command selected by the second reorder scheduling queue RSQ1 at this time may be a command that has no dependency on other commands within the corresponding scheduler.

For this purpose, the first reorder scheduling queue RSQ0 and the second reorder scheduling queue RSQ1 may each select an executable list out of read commands and an executable list out of write commands, and basically process them in sequence, and if the first reorder scheduling queue RSQ0 selects one of a write command and a read command out of the executable lists, then the second reorder scheduling queue RSQ1 may operate to select the other of the write command and the read command out of the executable lists.

As such, according to one embodiment of the present disclosure, by setting two commands to be processed simultaneously only when one of the first command and the second commands is a read command and the other is a write command, there arises an effect of being able to reduce the complexity of scheduling that the cache scheduler 20 must bear as compared to having to determine whether to process all commands simultaneously.

The access execution unit 30 may perform cache memory accesses to the scheduled commands classified as even numbers and the scheduled commands classified as odd numbers based on the cache tag CT, and in the case of a cache "hit" in which data corresponding to a particular command (packet) is present in the cache memory device 100 as a result of performing the cache memory accesses, the access results may be transferred to and queued in the completion scheduling queue CSQ of the cache scheduler 20. Then, the completion scheduling queue CSQ may transfer the queued access results to the processor (CPU) in the original order (i.e., the order in which the processor transmitted the commands). To this end, the completion scheduling queue CSQ may receive order information of each command from the decoder.

On the other hand, as a result of performing the cache memory accesses, in the case of a cache "miss" in which data corresponding to a particular command (packet) is not present in the cache memory device 100, direct memory accesses DMA may be performed to the main storage device and/or the auxiliary storage device by means of the direct memory access module DMA.

Second Embodiment

Figure 3:
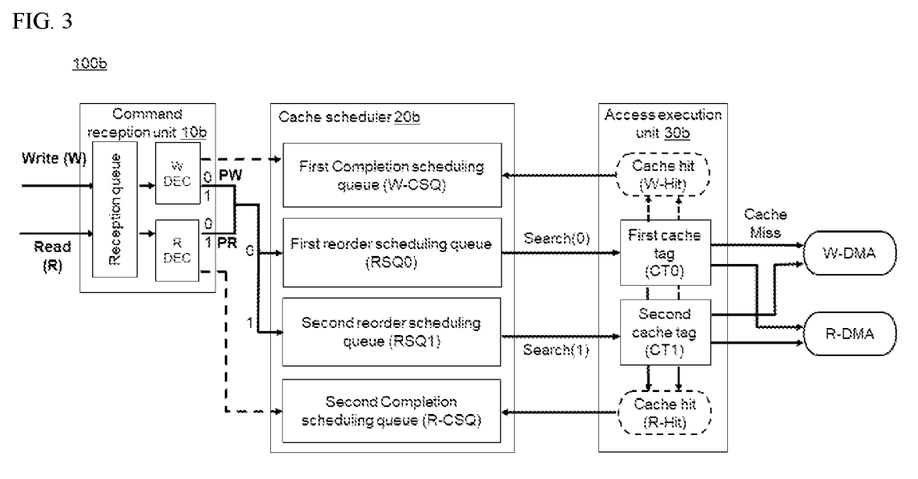
FIG. 3 is a diagram schematically showing a cache memory device including a multi-cache scheduler architecture in accordance with a second embodiment of the present disclosure.

FIG. 3 is a diagram schematically showing a cache memory device including a multi-cache scheduler architecture in accordance with a second embodiment of the present disclosure.

Referring to FIG. 3, a cache memory device 100b including a multi-cache scheduler architecture in accordance with the second embodiment of the present disclosure may include a command reception unit 10b, a cache scheduler 20b, and an access execution unit 30b.

The command reception unit 10b in accordance with the second embodiment is basically the same as the command reception unit 10 in accordance with the first embodiment, but has a difference in that it includes a first decoder WDEC for decoding each of the received write commands W, packetizing them in units of cache lines, and generating write command packets PW, and a second decoder RDEC for decoding each of the received read commands R, packetizing them in units of cache lines, and generating read command packets PR.

The first decoder WDEC and the second decoder RDEC of the command reception unit 10b may each classify the addresses of the write command packets PW and the read command packets PR as even or odd based on LSB, and transmit them to the cache scheduler 20b.

In this way, since the decoder is divided into the first decoder WDEC for generating the write command packets W and the second decoder RDEC for generating the read command packets PR, and each of the write commands and read commands is classified as even or odd through the LSB-based classification in each of the first decoder WDEC and the second decoder RDEC, there is an advantage that write and read commands can be classified into the same or similar numbers based on even/odd numbers even if there are more in one side of the write commands or read commands.

The cache scheduler 20b is a module for scheduling memory accesses, including cache memory accesses and direct memory accesses DMA corresponding to the write commands and read commands received from the processor. The cache scheduler 20b in accordance with the second embodiment of the present disclosure may be implemented in a multi-cache scheduler architecture that includes two reorder scheduling queues and two completion scheduling queues. That is, the cache scheduler 20b may include a first reorder scheduling queue RSQ0, a second reorder scheduling queue RSQ1, a first completion scheduling queue W-CSQ, and a second completion scheduling queue R-CSQ, which has a difference compared with including only one completion scheduling queue in the case of the first embodiment.

According to the second embodiment, as described above, write command packets PW and read command packets PR classified as even numbers (0) (hereinafter referred to as even-classified commands) based on the LSB from the command reception unit 10 may be transferred to the first reorder scheduling queue RSQ0, and write command packets PW and read command packets PR classified as odd numbers (1) (hereinafter referred to as odd-classified commands) may be transferred to the second reorder scheduling queue RSQ1.

The first reorder scheduling queue RSQ0 may be allowed to perform cache memory accesses by checking data dependency, whether out-of-order traffic can be allocated, and the like, and subsequently scheduling the even-classified commands and transmitting them to the access execution unit 30b. Likewise, the second reorder scheduling queue RSQ1 may be allowed to perform cache memory accesses by checking data dependency, whether out-of-order traffic can be allocated, and the like, and subsequently scheduling the odd-classified commands and transmitting them to the access execution unit 30b.

The access execution unit 30b may perform cache memory accesses via a first cache tag CT0 to the received even-classified commands scheduled by the first reorder scheduling queue RSQ0, and may perform cache memory accesses via a second cache tag CT1 to the received odd-classified commands scheduled by the second reorder scheduling queue RSQ1.

In this process, according to the second embodiment of the present disclosure, the access execution unit 30b may process a first command and a second command at the same time if one of the two commands is a read command and the other one of the two commends is a write command, wherein the first command is a command whose processing turn has arrived via the first cache tag CT0 among the scheduled even-classified commands and the second command is a command whose processing turn has arrived via the second cache tag CT1 among the scheduled odd-classified commands.

Since this simultaneous processing is performed via the separate cache tags CT0 and CT1, respectively, based on the even and odd classification, there is just the same processing burden as the existing half-duplex design on the access execution unit 30b, and thus, there arises an effect of being able to expect full-duplex or near full-duplex throughput by simultaneous processing while avoiding a situation where complexity increases in cache scheduling of the cache memory device 100b.

On the other hand, the access execution unit 30b may process a first command and a second command in sequence if both the first command whose processing turn has arrived via the first cache tag CT0 among the scheduled even-classified commands and the second command whose processing turn has arrived via the second cache tag CT1 among the scheduled odd-classified commands are read commands or write commands.

However, according to a modification of the second embodiment, it may be designed to proceed with simultaneous processing even if both the first command and the second command are read commands or write commands, and in this case, the complexity may be slightly higher than the existing half-duplex design, but there arises an effect of being able to expect cache bandwidth throughput that is substantially close to full duplex.

As a result of performing cache memory accesses, the access execution unit 30b may transfer the access results of the write commands that have been cache-hit W-Hit among the scheduled even-classified commands and the scheduled odd-classified commands to the first completion scheduling queue W-CSQ and queue same. That is, the write-classified commands that have been cache-hit in each of the first cache tag CT0 and the second cache tag CT1 may be transferred to and queued in the first completion scheduling queue W-CSQ, and the first completion scheduling queue W-CSQ may transfer the corresponding access results to the processor (CPU) in the order in which the corresponding commands were received. To this end, the first completion scheduling queue W-CSQ may receive order information of the write commands from the first decoder WDEC.

Likewise, as a result of performing the cache memory accesses, the access execution unit 30b may transfer the access results of the read commands that have been cache-hit R-Hit among the scheduled even-classified commands and the scheduled odd-classified commands to the second completion scheduling queue R-CSQ and queue same. That is, the read-classified commands that have been cache-hit in each of the first cache tag CT0 and the second cache tag CT1 may be transferred to and queued in the second completion scheduling queue R-CSQ, and the second completion scheduling queue R-CSQ may transfer the corresponding access results to the processor (CPU) in the order in which the corresponding commands were received. To this end, the second completion scheduling queue R-CSQ may receive order information of the read commands from the second decoder RDEC.

Meanwhile, as a result of performing the cache memory accesses by the access execution unit 30b, the main storage device and/or the auxiliary storage device may be accessed by performing direct memory accesses to the write commands that have been cache-missed among the scheduled commands classified as even numbers and the scheduled commands classified as odd numbers via a first direct memory access module W-DMA. In addition, as a result of performing the cache memory accesses by the access execution unit 30b, direct memory accesses may be performed to the read commands that have been cache-missed among the scheduled commands classified as even numbers and the scheduled commands classified as odd numbers via a second direct memory access module R-DMA.

In this way, according to the second embodiment of the present disclosure, by setting both commands to be processed simultaneously via separate cache tags and completion scheduling queues/direct memory accesses, respectively, if the read command and the write command are classified as even or odd numbers and the read command and write command are received at the same time, there arises a significant effect of being able to achieve substantially full-duplex scheduling efficiency while avoiding the PPA degradation of the cache scheduler by reducing the complexity of scheduling compared to full-duplex scheduling.

Third Embodiment

Figure 4:
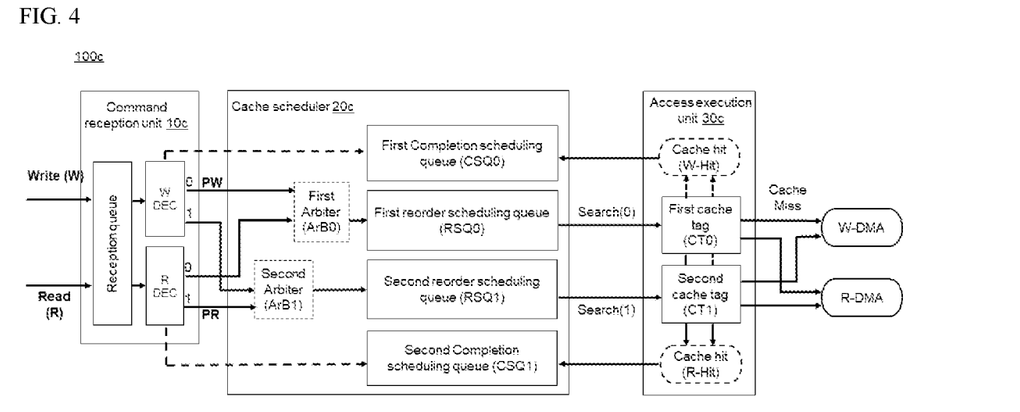
FIG. 4 is a diagram schematically showing a cache memory device including a multi-cache scheduler architecture in accordance with a third embodiment of the present disclosure.

FIG. 4 is a diagram schematically showing a cache memory device including a multi-cache scheduler architecture in accordance with a third embodiment of the present disclosure.

Referring to FIG. 4, a cache memory device 100c including a multi-cache scheduler architecture in accordance with the third embodiment of the present disclosure may include a command reception unit 10c, a cache scheduler 20c, and an access execution unit 30c.

The embodiment of FIG. 4 differs in the configuration of the cache scheduler 20c, and more specifically, in that the cache scheduler 20c includes a first arbiter ArB0 and a second arbiter ArB1, compared with the second embodiment described in relation to FIG. 3.

The first arbiter ArB0 and the second arbiter ArB1 may serve to connect between the first decoder WDEC and the second decoder RDEC and the first and second reorder scheduling queues RSQ0 and RSQ1 in the form of a full crossbar, and each of the first arbiter ArB0 and the second arbiter ArB1 may be a round robin arbiter operating in a round robin (RR) manner.

The first arbiter ArB0 may receive write and read commands classified as even numbers (0) by the first decoder WDEC and the second decoder RDEC, and may transfer the received write and read commands to the first reorder scheduling queue RSQ0. The second arbiter ArB1 may receive write and read commands classified as odd numbers (1) by the first decoder WDEC and the second decoder RDEC, and may transfer the received write and read commands to the second reorder scheduling queue RSQ1.

By applying such an arbiter structure, the cache scheduler 20c in accordance with the present disclosure has an advantage of being able to prevent a situation in which a bottleneck occurs only in one of the reorder scheduling queues (starvation) as the same or similar number of commands will be transferred to the first reorder scheduling queue RSQ0 and the second reorder scheduling queue RSQ1, respectively.

On the other hand, although not shown, if a cache miss occurs as a result of accesses via the first cache tag CT0 and the second cache tag CT1 of the access execution unit 30c, a write command is transferred to the first direct memory access module W-DMA, and a read command is transferred to the second direct memory access module R-DMA, and an arbiter structure may also be formed between the access execution unit 30c and the first and second direct memory access modules W-DMA and R-DMA and can be designed to reduce data bottlenecks.

Method for Implementing Dual Cache Scheduling

Figure 5:
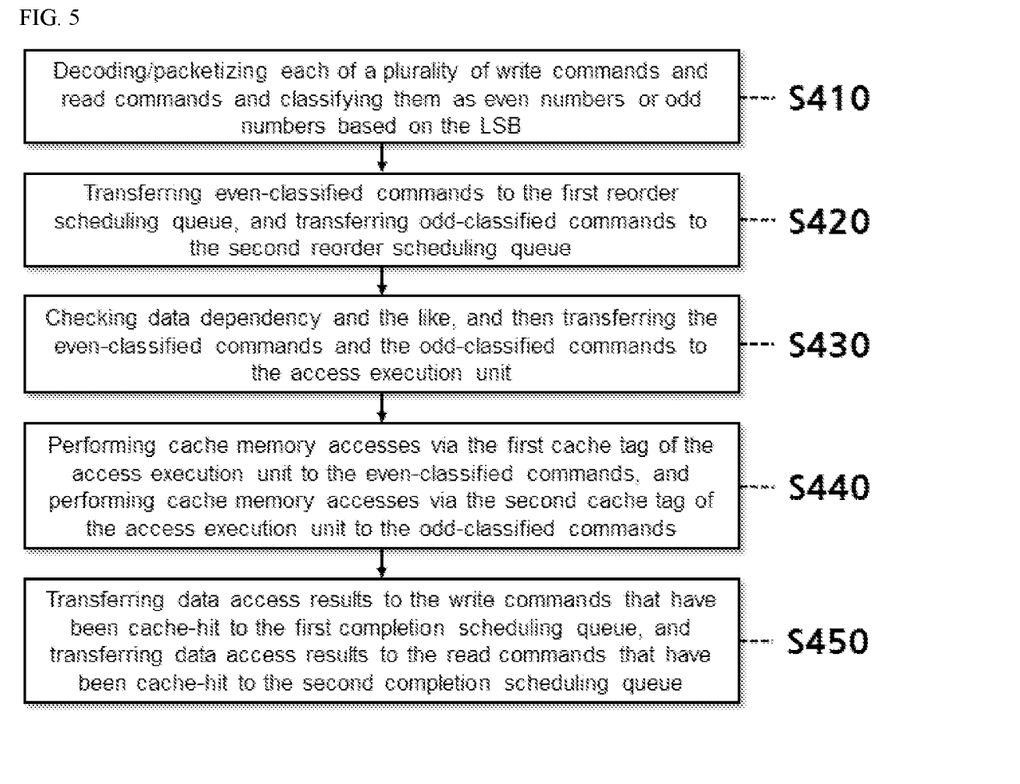
FIG. 5 is a flowchart of a method for implementing dual cache scheduling in accordance with one embodiment of the present disclosure.

FIG. 5 is a flowchart of a method for implementing dual cache scheduling in accordance with one embodiment of the present disclosure.

Referring to FIG. 5, first, in step S410, the command reception unit 10 of the cache memory device 100 may decode and packetize each of a plurality of write and read commands received from the processor (CPU) and classify them as even or odd based on the LSB. Accordingly, each of the write commands may be classified as an even or odd number, and each of the read commands may also be classified as an even or odd number.

In step S420, write commands and read commands classified as even numbers (hereinafter referred to as even-classified commands) may be transferred to the first reorder scheduling queue RSQ0 for scheduling for cache memory accesses, and write commands and read commands classified as odd numbers (hereinafter referred to as odd-classified commands) may be transferred to the second reorder scheduling queue RSQ1 for scheduling for cache memory accesses.

In step S430, the first reorder scheduling queue RSQ0 may check data dependency, whether out-of-order traffic can be allocated, and the like, and subsequently transfer the scheduled even-classified commands to the access execution unit 30, and the second reorder scheduling queue RSQ1 may check data dependency and then transfer the scheduled odd-classified commands to the access execution unit 30.

In step S440, the access execution unit may determine whether there is a cache hit or a cache miss as a result of performing cache memory accesses by performing cache memory accesses via the cache tag CT to the scheduled even-classified commands and the scheduled odd-classified commands.

In addition, according to another embodiment, the access execution unit may determine whether there is a cache hit or a cache miss by performing cache memory accesses via the first cache tag CT0 to the even-classified commands and performing cache memory accesses via the second cache tag CT1 to the odd-classified commands.

In this process, according to embodiments of the present disclosure, the access execution unit 30b may process a first command and a second command at the same time if one of the two commands is a read command and the other one of the two commands is a write command, wherein the first command is a command whose processing turn has arrived via the first cache tag CT0 among the scheduled even-classified commands and the second command is a command whose processing turn has arrived via the second cache tag CT1 among the scheduled odd-classified commands.

Since this simultaneous processing is performed via the separate cache tags CT0 and CT1, respectively, based on the even and odd classification, there is just the same processing burden as the existing half-duplex design on each cache tag, and thus, there arises an effect of being able to expect full-duplex or near full-duplex throughput by simultaneous processing while avoiding a situation where complexity increases in cache scheduling of the cache memory device 100b.

On the other hand, the access execution unit may process a first command and a second command in sequence if both the first command whose processing turn has arrived via the first cache tag CT0 among the scheduled even-classified commands and the second command whose processing turn has arrived via the second cache tag CT1 among the scheduled odd-classified commands are read commands or write commands.

In step S450, as a result of performing the cache memory accesses by the access execution unit, access results to the write commands that have been cache-hit among the scheduled commands classified as even numbers and the scheduled commands classified as odd numbers may be queued in the first completion scheduling queue, and access results to the read commands that have been cache-hit among the scheduled commands classified as even numbers and the scheduled commands classified as odd numbers may be queued in the second completion scheduling queue.

Then, direct memory accesses may be performed via the first direct memory access module to the write commands that have been cache-missed, and direct memory accesses may be performed via the second direct memory access module to the read commands that have been cache-missed.

Computer Readable Recording Medium

It is apparent that each step or operation of the method according to the embodiments of the present disclosure may be performed by a computer including one or more processors according to the execution of a computer program stored in a computer-readable recording medium.

The computer-executable instructions stored in the computer-readable recording medium may be implemented through a computer program programmed to perform each corresponding step, but such computer program may be stored in the computer-readable recording medium, and it is executable by a processor. The computer-readable recording medium may be a non-transitory readable medium. In this case, the non-transitory readable medium refers to a medium that stores data semi-permanently and can be read by a machine, which is different from a medium that stores data temporarily, such as a register, cache, memory, etc. Specifically, programs for performing the various methods described above may be provided while stored in a non-transitory readable medium such as semiconductor memory devices such as erasable programmable read-only memory (EPROM), electrically erasable programmable read-only memory (EEPROM), and flash memory devices, a magnetic disk such as internal hard disks and removable disks, an optical-magnetic disk, and a non-volatile memory including a CD-ROM and a DVD-ROM disk.

Methods according to the embodiments disclosed in the present disclosure may be provided by being included in a computer program product. The computer program product may be distributed in the form of a machine-readable storage medium (e.g., compact disc read only memory (CD-ROM)) or via online through an application store (e.g., Play Store™). In case of online distribution, at least part of the computer program product may be temporarily stored or temporarily generated in a storage medium such as a memory of a server of a manufacturer, a server of an application store, or a relay server.

Those skilled in the art to which the present disclosure pertains will be able to understand that the present disclosure may also be conducted in other specific forms without changing the technical spirit or essential features thereof. Therefore, the embodiments of the present disclosure are to be understood in all respects as illustrative and not restrictive. The scope of the present disclosure is presented by the following claims rather than the detailed description, and all changes or modifications derived from the meaning and scope of the claims and equivalent concepts thereof should be construed as being included in the scope of the present disclosure.

The features and advantages described herein are not all inclusive, and many additional features and advantages will become apparent to those skilled in the art, particularly upon consideration of the drawings, the specification, and the claims. Moreover, it should be noted that the language used herein has been selected primarily for the purpose of readability and explanation, and has not been selected to limit the subject matter of the present disclosure.

The above description of the embodiments of the present disclosure has been presented for purposes of illustration. It is not intended to be exhaustive or to limit the invention to the precise form disclosed. Those skilled in the art will appreciate that many modifications and variations are possible in light of the present disclosure.

Therefore, the scope of the present invention is not limited by the detailed description, but by the claims of the present disclosure. Accordingly, the embodiments of the present disclosure is illustrative and not intended to limit the scope of the present invention as set forth in the following claims.

What is claimed is:
1. A cache memory device comprising:
   a command reception unit for packetizing each of read commands and write commands and classifying each of the read commands and the write commands as an even number or an odd number based on an address of each packet;

a cache scheduler comprising a first reorder scheduling queue for receiving commands classified as even numbers from the command reception unit and scheduling the commands classified as even numbers for cache memory accesses and a second reorder scheduling queue for receiving commands classified as odd numbers from the command reception unit and scheduling the commands classified as odd numbers for cache memory accesses; and an access execution unit for performing cache memory accesses via a cache tag to scheduled commands classified as even numbers and scheduled commands classified as odd numbers, wherein the access execution unit processes a first command and a second command at the same time if one of the two commands is a read command and the other of the two commands is a write command, wherein the first command is a command whose processing turn has arrived among the scheduled commands classified as even numbers and the second command is a command whose processing turn has arrived among the scheduled commands classified as odd numbers.

2. The cache memory device of claim 1, wherein in order for the first reorder scheduling queue and the second reorder scheduling queue to process the first command and the second command at the same time, if the first command selected by the first reorder scheduling queue is one of a read command and a write command, then the second reorder scheduling queue selects the second command as the other of the read command and the write command.

3. The cache memory device of claim 1, wherein the access execution unit processes a first command and a second command in sequence if both the first command whose processing turn has arrived among the scheduled commands classified as even numbers and the second command whose processing turn has arrived among the scheduled commands classified as odd numbers are read commands or write commands.

4. The cache memory device of claim 1, wherein the cache tag comprises:
a first cache tag for allowing cache memory accesses to be executed to the scheduled commands classified as even numbers; and
a second cache tag for allowing cache memory accesses to be executed to the scheduled commands classified as odd numbers.

5. The cache memory device of claim 1, further comprising:
a first completion scheduling queue for queuing access results to write commands that have been cache-hit among the scheduled commands classified as even numbers and the scheduled commands classified as odd numbers as a result of performing cache memory accesses by the access execution unit; and
a second completion scheduling queue for queuing access results to read commands that have been cache-hit among the scheduled commands classified as even numbers and the scheduled commands classified as odd numbers as a result of performing the cache memory accesses by the access execution unit.

6. The cache memory device of claim 1, comprising:
a first direct memory access module for performing direct memory accesses to write commands that have been cache-missed among the scheduled commands classified as even numbers and the scheduled commands classified as odd numbers as a result of performing cache memory accesses by the access execution unit; and
a second direct memory access module for performing direct memory accesses to read commands that have been cache-missed among the scheduled commands classified as even numbers and the scheduled commands classified as odd numbers as a result of performing the cache memory accesses by the access execution unit.

7. The cache memory device of claim 1, wherein even-odd classification for each of the read commands and the write commands is made based on a least significant bit (LSB) of an address of each of the read commands and the write commands.

8. The cache memory device of claim 1, wherein the command reception unit comprises:
a reception queue for receiving the write commands and the read commands from a processor;
a first decoder for decoding and packetizing the received write commands in units of cache lines; and
a second decoder for decoding and packetizing the received read commands in units of cache lines.

9. The cache memory device of claim 8, wherein the cache scheduler comprises:
a first arbiter for receiving the commands classified as even numbers from the first decoder and the second decoder of the command reception unit and transferring the commands classified as even numbers to the first reorder scheduling queue; and
a second arbiter for receiving the commands classified as odd numbers from the first decoder and the second decoder of the command reception unit and transferring the commands classified as odd numbers to the second reorder scheduling queue,
wherein the first arbiter and the second arbiter are round robin arbiters.

10. A computing system comprising:
a processor;
a main storage device for storing commands or data associated with a program executed via the processor;
an auxiliary storage device for assisting the main storage device; and
a cache memory device located between the processor and the main storage device for temporarily storing commands or data of the main storage device or the auxiliary memory device,
wherein the cache memory device comprises:
a command reception unit for packetizing each of read commands and write commands and classifying each of the read commands and the write commands as an even number or an odd number based on an address of each packet;
a cache scheduler comprising a first reorder scheduling queue for receiving commands classified as even numbers from the command reception unit and scheduling the commands classified as even numbers for cache memory accesses and a second reorder scheduling queue for receiving commands classified as odd numbers from the command reception unit and scheduling the commands classified as odd numbers for cache memory accesses; and
an access execution unit for performing cache memory accesses via a cache tag to scheduled commands classified as even numbers and scheduled commands classified as odd numbers, wherein the access execution unit processes a first command and a second command at the same time if one of the two commands is a read command and the other of the two commands is a write command, wherein the first command is a command whose processing turn has arrived among the scheduled commands classified as even numbers and the second command is a command whose processing turn has arrived among the scheduled commands classified as odd numbers.

11. A method for implementing cache scheduling, wherein the method is performed by a cache memory device, the method comprising:
  packetizing each of read commands and write commands and classifying each of the read commands and the write commands as an even number or an odd number based on an address of each packet;
  transferring commands classified as even numbers to a first reorder scheduling queue for scheduling for cache memory accesses, and transferring commands classified as odd numbers to a second reorder scheduling queue for scheduling for cache memory accesses;
  transferring scheduled commands classified as even numbers and scheduled commands classified as odd numbers to an access execution unit for performing memory accesses; and
  performing cache memory accesses to the scheduled commands classified as even numbers and the scheduled commands classified as odd numbers via a cache tag,
  wherein the performing the cache memory accesses comprises:
  processing a first command and a second command at the same time if one of the two commands is a read command and the other of the two commands is a write command, wherein the first command is a command whose processing turn has arrived among the scheduled commands classified as even numbers and the second command is a command whose processing turn has arrived among the scheduled commands classified as odd numbers.

12. The method for implementing cache scheduling of claim 11, wherein in order for the first reorder scheduling queue and the second reorder scheduling queue to process the first command and the second command at the same time, if the first command selected by the first reorder scheduling queue is one of a read command and a write command, then the second reorder scheduling queue selects the second command as the other of the read command and the write command.

13. The method for implementing cache scheduling of claim 11, wherein the performing the cache memory accesses comprises:
  processing a first command and a second command in sequence by the access execution unit if both the first command whose processing turn has arrived among the scheduled commands classified as even numbers and the second command whose processing turn has arrived among the scheduled commands classified as odd numbers are read commands or write commands.

14. The method for implementing cache scheduling of claim 11, wherein the performing the cache memory accesses comprises:
  executing cache memory accesses to the scheduled commands classified as even numbers via a first cache tag; and
  executing cache memory accesses to the scheduled commands classified as odd numbers via a second cache tag.

15. The method for implementing cache scheduling of claim 11, further comprising:
  queuing, in a first completion scheduling queue, access results to write commands that have been cache-hit among the scheduled commands classified as even numbers and the scheduled commands classified as odd numbers as a result of performing the cache memory accesses; and
  queuing, in a second completion scheduling queue, access results to read commands that have been cache-hit among the scheduled commands classified as even numbers and the scheduled commands classified as odd numbers as a result of performing the cache memory accesses.

16. The method for implementing cache scheduling of claim 11, further comprising:
  performing direct memory accesses, to at least one of a main storage device and an auxiliary storage device, for write commands that have been cache-missed among the scheduled commands classified as even numbers and the scheduled commands classified as odd numbers as a result of performing the cache memory accesses; and
  performing direct memory accesses, to at least one of a main storage device and an auxiliary storage device, for read commands that have been cache-missed among the scheduled commands classified as even numbers and the scheduled commands classified as odd numbers as a result of performing the cache memory accesses.

\* \* \* \* \*